United States Patent
Baron et al.

(10) Patent No.: US 11,961,173 B2
(45) Date of Patent: Apr. 16, 2024

(54) SYSTEMS AND METHODS TO RECONFIGURE A SCENE BASED ON TIMING AND SCENE CONTENT

(71) Applicant: Mindshow Inc., Los Angeles, CA (US)

(72) Inventors: Gil Baron, Los Angeles, CA (US); William Stuart Farquhar, Hollis, NH (US); John Henry Kanikula Peters, Glendale, CA (US)

(73) Assignee: Mindshow Inc., Los Angeles, CA (US)

( * ) Notice: Subject to any disclaimer, the term of this patent is extended or adjusted under 35 U.S.C. 154(b) by 78 days.

(21) Appl. No.: 17/835,938

(22) Filed: Jun. 8, 2022

(65) Prior Publication Data

US 2023/0401771 A1 Dec. 14, 2023

(51) Int. Cl.
- *G06T 7/70* (2017.01)
- *G06T 13/00* (2011.01)
- *G10L 15/08* (2006.01)
- *G10L 15/22* (2006.01)

(52) U.S. Cl.
CPC ............... *G06T 13/00* (2013.01); *G06T 7/70* (2017.01); *G10L 15/08* (2013.01); *G10L 15/22* (2013.01); *G06T 2207/10016* (2013.01); *G06T 2210/61* (2013.01); *G10L 2015/088* (2013.01)

(58) Field of Classification Search
CPC ... G10L 15/08; G10L 15/22; G10L 2015/088; G06T 7/70; G06T 13/00; G06T 2207/10016; G06T 2210/61
USPC ......................................................... 345/473
See application file for complete search history.

(56) References Cited

U.S. PATENT DOCUMENTS

| | | | |
|---|---|---|---|
| 10,192,585 B1 * | 1/2019 | Adsumilli | H04N 5/77 |
| 10,402,698 B1 * | 9/2019 | Tse | G06V 20/41 |
| 2016/0071549 A1 * | 3/2016 | von Sneidern | H04N 21/8549 386/241 |
| 2017/0024614 A1 * | 1/2017 | Sanil | G06F 16/70 |

* cited by examiner

*Primary Examiner* — Jacinta M Crawford

(74) *Attorney, Agent, or Firm* — Esplin & Associates, PC

(57) ABSTRACT

Systems and methods to reconfigure a scene based on timing and scene content are disclosed. Exemplary implementations may: obtain scene information defines a scene in which an event transpires; analyze the scene information that defines the event to identify effectual content and ineffectual content related to the event within the unedited event duration; and generate, based on the scene information and the analysis, a draft scene that includes an edited event comprising the effectual content from an edited event beginning to an edited event end in accordance with the prospective event duration.

20 Claims, 3 Drawing Sheets

SYSTEMS AND METHODS TO RECONFIGURE A SCENE BASED ON TIMING AND SCENE CONTENT

FIELD OF THE DISCLOSURE

The present disclosure relates to systems and methods to reconfigure a scene based on timing and scene content.

BACKGROUND

Animators or editors of scenes, such as animation scenes, may aim to elongate or shorten scenes and/or events that transpire during the scenes. Currently, the animators may be required to manually review and cut portions of the scenes out and/or lengthen other portions of the scenes.

SUMMARY

One aspect of the present disclosure related to a system automatically editing or modifying a scene. The modification to the scene may modify an event duration of an event with the scene so that the event transpires over a prospective event duration. Obtained scene information that defines the scene may be analyzed to identify effectual content and ineffectual content related to the event. In accordance with the prospective event duration, a draft scene may be generated to include some of the effectual content and the ineffectual content. Thus, the draft scene may include an edited event duration as opposed to the event duration originally in the scene. Further, the draft scene may be a variation of the scene that is still coherent with cohesive content and within or close to the prospective event duration. As such, editors may not be required to manually review and edit scenes as the system automatically executes appropriate analysis and generation of the draft scene. This may reduce production and development time for projects of content producers and creators.

One aspect of the present disclosure relates to a system configured to reconfigure a scene based on timing and scene content. The system may include one or more hardware processors configured by machine-readable instructions. The machine-readable instructions may include one or more instruction components. The instruction components may include computer program components. The instruction components may include one or more of information obtaining component, analysis component, draft scene generating component, and/or other instruction components.

The information obtaining component may be configured to obtain scene information that defines a scene in which an event transpires. The scene may include performances of entities within a virtual reality setting over a scene duration from a scene beginning to a scene end. The event may have a prospective event duration. The event may have an unedited event duration from an event beginning to an event end. The prospective event duration may be a prospective duration of the event within the scene.

The analysis component may be configured to analyze the scene information that defines the event to identify effectual content and ineffectual content related to the event within the unedited event duration.

The draft scene generating component may be configured to generate a draft scene. The draft scene may be generated based on the scene information, the analysis, and/or other information. The scene draft may include an edited event including the effectual content from an edited event beginning to an edited event end in accordance with the prospective event duration.

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1:
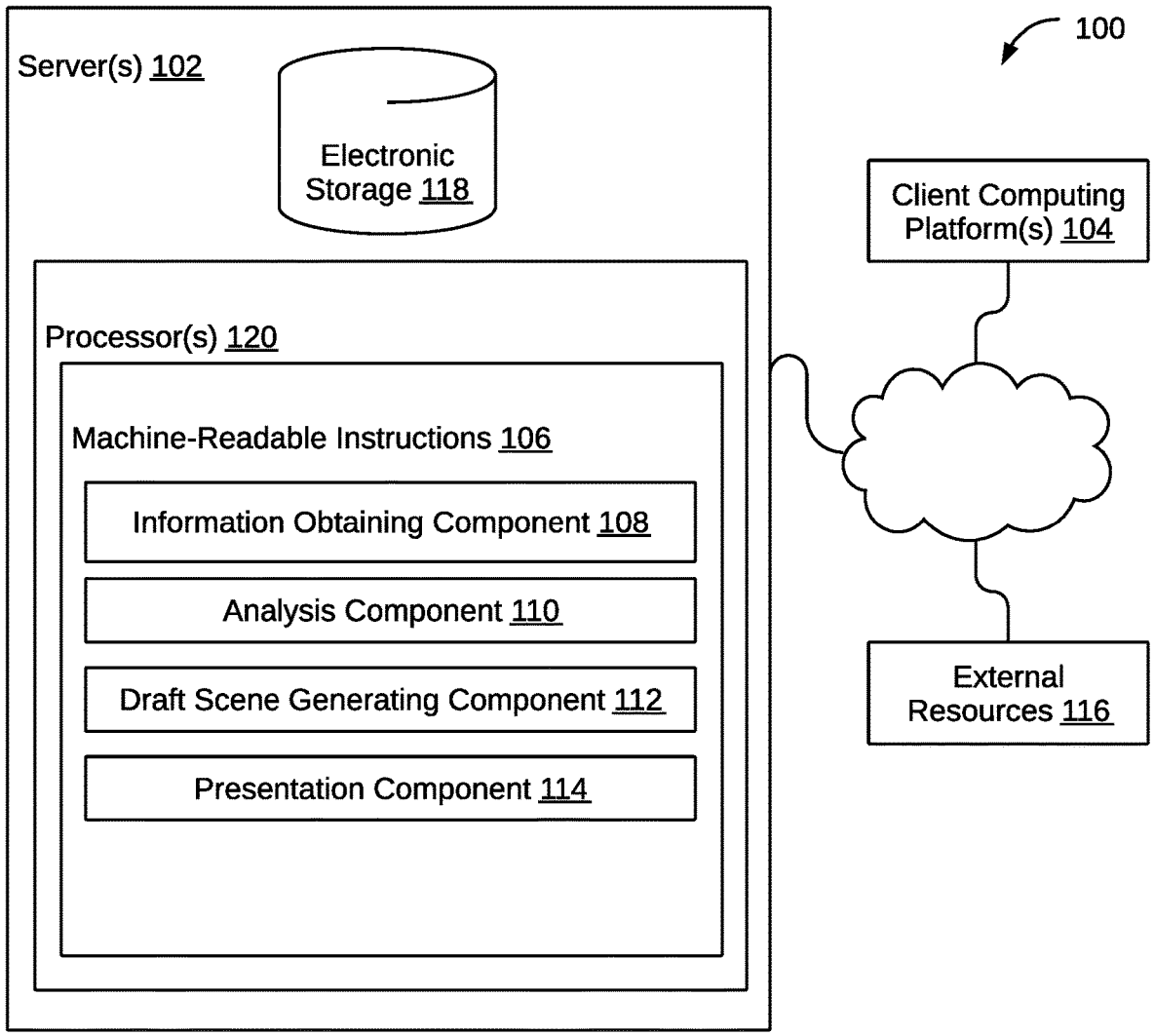
FIG. 1 illustrates a system configured to reconfigure a scene based on timing and scene content, in accordance with one or more implementations.

FIG. 1 illustrates a system 100 configured to reconfigure a scene based on timing and scene content, in accordance with one or more implementations. In some implementations, system 100 may include one or more servers 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may be configured by machine-readable instructions 106. Machine-readable instructions 106 may include one or more instruction components. The instruction components may include computer program components. The instruction components may include one or more of information obtaining component 108, analysis component 110, draft scene generating component 112, presentation component 114, and/or other instruction components.

Information obtaining component 108 may be configured to obtain scene information defines a scene in which an event transpires. The scene may include performances of entities within a virtual reality setting over a scene duration from a scene beginning to a scene end. The scene beginning may be the start of the scene. The scene end may be termination of the scene. The event may be a particular performance that is intended to be edited or modified within the scene. The event may be modified to be longer, to be shorter, to elongate a particular point of view, to shorten a particular point of view, and/or other modifications. The event may have an unedited event duration from an event beginning to an event end. The unedited event duration of the event may be a length of time that the event originally transpires for in the scene.

The virtual reality setting may comprise a virtual environment that surrounds one or more of the entities within animation scenes. The virtual environment may comprise of a topography, the entities present, simulated physical phenomena (e.g., wind, rain, earthquakes, and/or other phenomena), and/or other elements of the virtual environment. In some instances, the topography may be a 2-dimensional topography. In other instances, the topography may be a 3-dimensional topography. The topography may include dimensions of the space, and/or surface features of a surface or entities (e.g., inanimate objects) that are "native" to the space. In some instances, the topography may describe a surface (e.g., a ground surface) that runs through at least a substantial section of the space. In some instances, the topography may describe a volume with one or more entities positioned therein (e.g., a simulation of gravity-deprived space with one or more celestial bodies positioned therein). For example, the virtual environment may include nature entities (e.g., trees, bodies of water, mountains, etc.), interior entities (e.g., a couch, a chair, a lamp, etc.), and/or other entities.

The event that transpires in the scene may include effectual content and ineffectual content. The effectual content may be content that includes substantive speech, action, and/or views that affect a purpose of the event and thus the scene. In some implementations, the effectual content may be content that are to be emphasized or should be included in the event and thus the scene. The ineffectual content may be content that includes non-substantive action, views, panning, and/or speech that do not affect the purpose of the event and thus the scene. In some implementations, the ineffectual content may be content that are to be minimized. By way of non-limiting example, effectual content may include a dialogue, a monologue, action, a close-up, arrival at a location or mark, and/or other effectual content. By way of non-limiting example, the ineffectual content may include a long shot of the entities, scenery content, traveling content, excess action, and/or other ineffectual content. The excess action may include an action that exceed a particular action duration threshold. By way of non-limiting example, the action may include one or more of running, walking, fighting, crying, laughing, and/or other actions. In some implementations, an action duration threshold may be associated with individual actions. The action duration threshold may be fixed by system 100 or definable by a user via client computing platform 104.

The event may have or be associated with a prospective event duration. The prospective event duration may be a goal duration of the event within the scene. That is, the event may be intended to transpire over the prospective duration. In some implementations, the unedited event duration may be longer than the prospective event duration. In some implementations, the unedited event duration may be less than the prospective event duration. By way of non-limiting example, the prospective event duration may include a prospective event beginning, a prospective event end, a length of time, and/or other information that describes the prospective event duration. The prospective event beginning and the prospective event end may be timestamps within the scene duration.

The scene information may include multiple scene sequences, entity information, audio information, tuning information, a maximum threshold duration of the event within the scene, and/or other information. Individual scene sequences may define positions of the entities in the virtual reality setting as a function of progress through the scene duration. The positions of the entities may include a yaw angle, a pitch angle, a roll angle, heading, pointing direction, and/or other positions. In some implementations, the positions of the entities may be defined by video content captured from a scene sequence perspective. In some implementations, the video content may be captured from more than one scene sequence perspective. The scene sequence perspective may be a point of view of the scene sequence captured by virtual cameras or physical cameras. In implementations where there are more than one scene sequence perspective, the positions may the entities may be different for the individual scene sequence perspectives. The video content may convey motion and/or sound of the entities during the scene sequence.

In some implementations, the positions of the entities may be based on output signals generated by wearable sensors by users. The users may wear sensors to capture the motion and/or for the entities. By way of non-limiting example, the sensors may include an inertial measurement unit (IMU) such as one or more of an accelerometer, a gyroscope, a magnetometer, Inclinometers, Electronic nose, Infrared Imagers, Micro-bolometers, micro-displays (DMD), Digital micro-mirror device, Optical Switches, a GPS, an altimeter, microphone, and/or other sensors. Based on one or more of the sensors, the positions of the entities relative to other entities may be determined.

The entity information may define the entities in the scene. The entity information for individual ones of the entities may include entity definitions and/or other entity information. The individual entity definitions may define the individual entities in an associated scene. The entity definitions may include entity values that define entity parameters including one or more of a visual appearance, an audio, a location, a pose of the entity, style of movement, and/or entity parameters. The visual appearance of the individual entities may include one or more of clothing, height, width, hairstyle, accessories, skin color, headwear, and/or other visual appearances. The audio of the individual entities may include entity voices, entity-initiated noises (e.g., stomp, clap, etc.) and/or other audio related to the individual entities. The audio conveyed by the entities may be based on the sound made by the one or more subjects. Individual locations of the individual entities may change throughout a scene duration. For example, the entities may walk, run, dance, fight, and/or other actions of which change the location of the individual entities. The individual locations of the individual entities may define virtual coordinates within virtual reality setting that adjust with movement of the entities. Pose of the individual entities may define the posture, attitude of the entity's body, attitude of the entity's head, and/or other poses of the individual entities. The attitude may include values for a yaw angle, a pitch angle, and a roll angle. The location and/or the pose of the entities may correspond with the individual scene sequences and the positions of the entities thereof. The style of movement may refer to how the individual entities within the associated scene generally move. For example, how a head, a trunk, and limbs of a human may move is a different style than how a head, a trunk, and limbs of a puppet may move. By way of non-limiting example, the style of movement may include human-like, puppet-like, robotic, barbaric, and/or other styles of movement.

The audio information may represent sound captured. The sound may be made by users for embodiment by the entities in the scene. The sound may include speech from a performer and/or user, sound made by objects, and/or other sounds. The sound may correspond to sound portrayed by an entity. For example, the sound may be a portion of conversation for a character, a sound for an object in the scene (e.g., a pair of gloves for bird wings flapping), a sound of an object (e.g., a car), and/or other sound. The sound may be captured by client computing platform(s) 104, audio components (e.g., microphones), separate from system 100, and/or other components.

The tuning information may define values to animation parameters for the associated scene. The tuning information may include values that define the animation parameters that include one or more of visual attributes, ambient audio, lighting, the style of movement for all entities, an animation style, and/or other animation parameters. The visual attributes include one or more of a color, shading, a pattern, a texture, and/or other parameters for visual attributes. Ambient audio may include one or more background noises such as car traffic, animal noises (e.g., dog barking, birds chirping), talking, and/or other ambient audio. Lighting may include ambient lighting, spot lighting, accent lighting, and/or other lighting. The animation style may be one of stop motion, two-dimensional motion, three-dimensional motion, traditional animation, motion graphics, Claymation, and/or other animation styles.

The maximum threshold duration of the event within the scene may be a maximum duration that the prospective duration may be. The maximum threshold duration may be marginally longer than the prospective duration. The event may not be permitted to transpire longer than the maximum threshold duration. For example, the prospective event duration may be five seconds and the maximum threshold duration may be eight seconds. The maximum threshold duration may facilitate with generation of a draft scene that includes an edited event, i.e., a variation of the event. That is, the maximum threshold duration may provide additional time that the edited event may transpire to ensure quality and/or coherency of the edited event.

Analysis component 110 may be configured to analyze the scene information that defines the event to identify the effectual content and the ineffectual content related to the event within the unedited event duration. The effectual content and the ineffectual content identified may be appropriately the effectual content and the ineffectual content to accommodate for the prospective event duration and/or the maximum duration threshold. That is, not all ineffectual content may be identified to be disregarded, but some ineffectual content may be identified to be included in the edited event. Further, not all effectual content may be identified to be included in the edited event, but some effectual content (e.g., an isolated or irrelevant joke said by a character) may be disregarded and not included in the edited event.

In some implementations, analyzing the scene information to identify the effectual content and the ineffectual content may include analyzing the audio information to identify the dialogue, the monologue, silence, and/or other audio information. Analyzing the scene information may include analyzing the audio information for distinct voices, associating individual ones of the distinct voices with particular entities and/or users (e.g., performers), and storing the associations. Analyzing the audio information may include the dialogue and/or the monologue to determine whether particular portions (e.g., sentences, phrases) are effectual or ineffectual to the event. Analyzing the audio information may be performed by novel or unique techniques.

In some implementations, analyzing the scene information to identify the effectual content and the ineffectual content may include determining changes in the positions of the entities in the virtual reality setting as a function of progress through the scene duration. That is, the scene sequences may be analyzed to determine the changes in the positions of the entities as the scene duration progresses. In some implementations, particular changes in the positions or lack thereof may be classified as the effectual content and the ineffectual content by a user. Meaning, analysis component 110 may be configured to receive the particular changes in the positions and whether such changes in the positions are the effectual content or the ineffectual content. By way of non-limiting example, the changes in the positions received may include displacement of the entities, displacement of the entities of a particular distance, an angle rotation of the yaw angle, an angle rotation of the pitch angle, an angle rotation of the roll angle of the entities, and/or other changes in positions.

In some implementations, analyzing the scene information to identify the effectual content and the ineffectual content may include determining occurrence of one or more triggers based on the audio information, the scene sequences, and/or other information. Individual triggers may correspond to either the effectual content or the ineffectual content. By way of non-limiting example, the trigger may include a word, a phrase, a particular action, a particular entity, a particular user, a particular change in the positions, silence, and/or other triggers. Thus, in some implementations, analysis component 110 may be configured to receive the trigger and subsequently identify the effectual content and the ineffectual content based on the associations, the triggers, the classifications, and/or other information. The trigger may be input by the users via client computing platforms 104.

In some implementations, identify the effectual content and the ineffectual content may include receiving classifications and/or descriptions from client computing platform 104 associated with the users. The classifications and/or descriptions may specify the effectual content and the ineffectual content related to one or more events. That is, the users may specify particular content that is substantive or non-substantive. In some implementations, the users may specify particular content that is substantive but not to be utilized, and thus is classified as ineffectual content, and/or the users may specify particular content that is non-substantive but to be utilized, and thus is classified as effectual content. In some implementations, novel and/or known machine learning techniques may be utilized to identify the effectual content and the ineffectual content based on or not based on the classifications and/or descriptions from the users.

Draft scene generating component 112 may be configured to generate the draft scene. The draft scene may be generated based on the scene information, the analysis, and/or other information. The draft scene may include an edited event. The edited event may include at least some of the effectual content from an edited event beginning to an edited event end in accordance with the prospective event duration and the maximum threshold duration. The edited event may be a variation of the event from the scene where the effectual content is focused on and within the prospective event duration or at least the maximum threshold duration. In some implementations, the ineffectual content may be included in the edited event where duration of the ineffectual content may be minimized or elongated in accordance with the prospective duration. The draft scene may be similar to the scene originally but rather includes the edited event as opposed to the event in its original form/duration.

Presentation component 114 may be configured to present the draft scene via client computing platforms 104. The draft scene may be presented subsequent to generation. The draft scene may be saved as supplemental scene information in association with the scene information. The supplemental scene information may include a secondary scene duration from a scene beginning to a scene end of the draft scene. In some implementations, based on the draft scene and the supplemental scene information, the user may further adjust the edited event within the draft scene by way of a similar technique as described herein for the scene. That is, the supplemental information may include a second prospective event duration, similarly utilized as the prospective event duration is, for the edited event. The user may input the second prospective event duration via client computing platform(s) 104.

Figure 3:
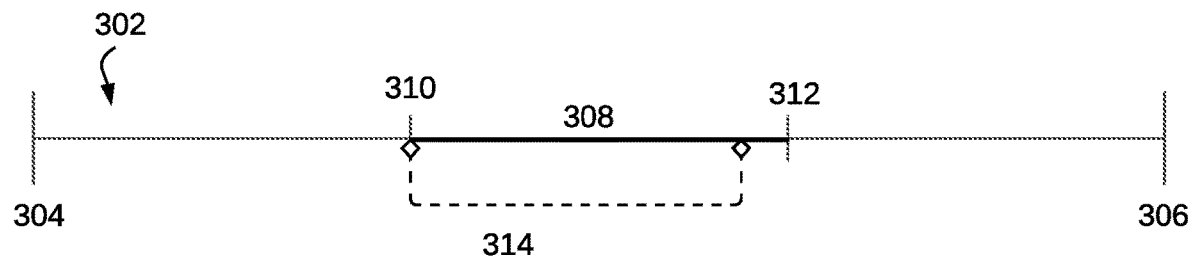
FIG. 3 illustrates an example implementation of the system configured to reconfigure a scene based on timing and scene content, in accordance with one or more implementations.

FIG. 3 illustrates a visualization of a scene duration 302 for a scene that transpires from a scene beginning 304 to a scene end 306. The scene includes an event that transpires over an unedited event duration 308 during the scene and thus during a portion of scene duration 302. Unedited event duration 308 transpires from an event beginning 310 to an event end 312. Scene information obtained may define the scene, scene duration 302, unedited event duration 308, and a prospective event duration 314 for event 308 to transpire over as opposed to event duration 308.

Figure 4:
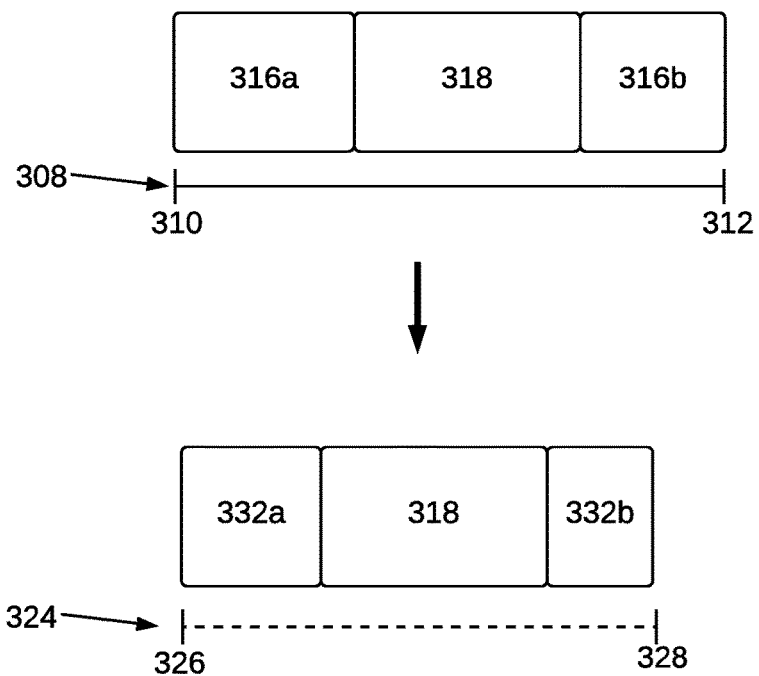
FIG. 4 illustrates an example implementation of the system configured to reconfigure a scene based on timing and scene content, in accordance with one or more implementations.

Referring to FIG. 4 that is related to FIG. 3, the event that transpires over unedited event duration 308 may include ineffectual content 316*a* and 316*b* and effectual content 318. Given that the prospective event duration 314 is less than or short than unedited event duration 308, ineffectual content 316*a* and 316*b* and effectual content 318 may be identified and modified to be in accordance with prospective event duration 314. That is, some of ineffectual content 316*a* and 316*b* may be eliminated or trimmed to ineffectual content 322*a* and 322*b*, respectively, and all of effectual content 318 may be maintained. Thus, a draft scene may be generated and include ineffectual content 322*a* and 322*b* and all of effectual content 318 than transpire over an edited event duration 324. Edited event duration 324 may be the same as prospective event duration 314 or close and may transpire from an event beginning 326 to an event end 328.

Referring to FIG. 1, in some implementations, server(s) 102, client computing platform(s) 104, and/or external resources 116 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 116 may be operatively linked via some other communication media.

A given client computing platform 104 may include one or more processors configured to execute computer program components. The computer program components may be configured to enable an expert or user associated with the given client computing platform 104 to interface with system 100 and/or external resources 116, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 116 may include sources of information outside of system 100, external entities participating with system 100, and/or other resources. In some implementations, some or all of the functionality attributed herein to external resources 116 may be provided by resources included in system 100.

Server(s) 102 may include electronic storage 118, one or more processors 120, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 118 may comprise non-transitory storage media that electronically stores information. The electronic storage media of electronic storage 118 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 118 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 118 may include one or more virtual storage resources (e.g., cloud storage, a virtual private network, and/or other virtual storage resources). Electronic storage 118 may store software algorithms, information determined by processor(s) 120, information received from server(s) 102, information received from client computing platform(s) 104, and/or other information that enables server(s) 102 to function as described herein.

Processor(s) 120 may be configured to provide information processing capabilities in server(s) 102. As such, processor(s) 120 may include one or more of a digital processor, an analog processor, a digital circuit designed to process information, an analog circuit designed to process information, a state machine, and/or other mechanisms for electronically processing information. Although processor(s) 120 is shown in FIG. 1 as a single entity, this is for illustrative purposes only. In some implementations, processor(s) 120 may include a plurality of processing units. These processing units may be physically located within the same device, or processor(s) 120 may represent processing functionality of a plurality of devices operating in coordination.

Processor(s) 120 may be configured to execute components 108, 110, 112, and/or 114, and/or other components. Processor(s) 120 may be configured to execute components 108, 110, 112, and/or 114, and/or other components by software; hardware; firmware; some combination of software, hardware, and/or firmware; and/or other mechanisms for configuring processing capabilities on processor(s) 120. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, and/or 114 are illustrated in FIG. 1 as being implemented within a single processing unit, in implementations in which processor(s) 120 includes multiple processing units, one or more of components 108, 110, 112, and/or 114 may be implemented remotely from the other components. The description of the functionality provided by the different components 108, 110, 112, and/or 114 described below is for illustrative purposes, and is not intended to be limiting, as any of components 108, 110, 112, and/or 114 may provide more or less functionality than is described. For example, one or more of components 108, 110, 112, and/or 114 may be eliminated, and some or all of its functionality may be provided by other ones of components 108, 110, 112, and/or 114. As another example, processor(s) 120 may be configured to execute one or more additional components that may perform some or all of the functionality attributed below to one of components 108, 110, 112, and/or 114.

Figure 2:
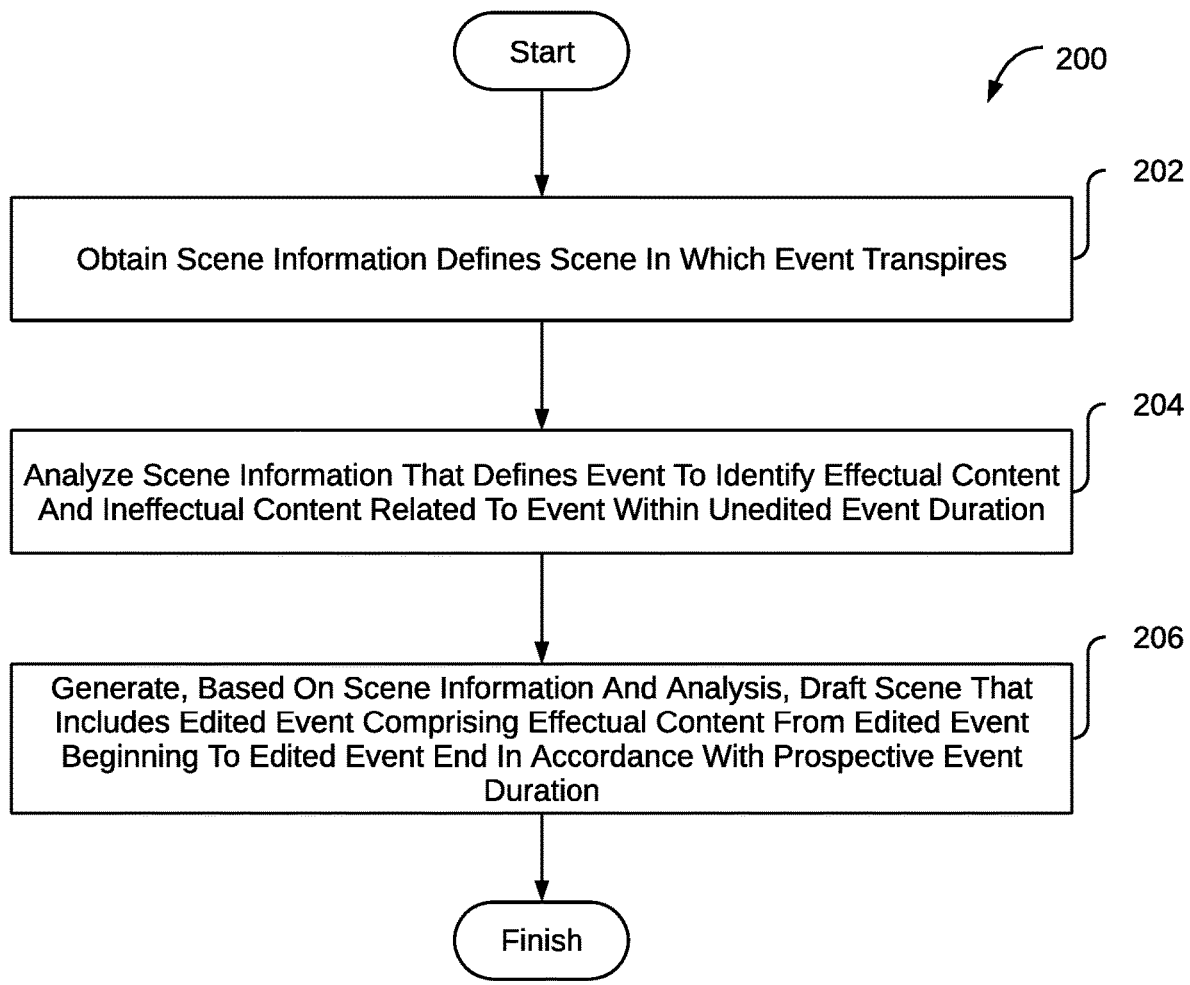
FIG. 2 illustrates a method to reconfigure a scene based on timing and scene content, in accordance with one or more implementations.

FIG. 2 illustrates a method 200 to reconfigure a scene based on timing and scene content, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include obtaining scene information defines a scene in which an event transpires. The scene may include performances of entities within a virtual reality setting over a scene duration from a scene beginning to a scene end. The event may have a prospective event duration. The event may have an unedited event duration from an event beginning to an event end. The prospective event duration may be a prospective duration of the event within the scene. Operation 202 may be performed by one or more hardware processors configured by machine-readable instructions including a component that is the same as or similar to information obtaining component 108, in accordance with one or more implementations.

An operation 204 may include analyzing the scene information that defines the event to identify effectual content and ineffectual content related to the event within the unedited event duration. Operation 204 may be performed by one or more hardware processors configured by machine-readable instructions including a component that is the same as or similar to analysis component 110, in accordance with one or more implementations.

An operation 206 may include generating, based on the scene information and the analysis, a draft scene that includes an edited event including the effectual content from an edited event beginning to an edited event end in accordance with the prospective event duration. Operation 206 may be performed by one or more hardware processors configured by machine-readable instructions including a component that is the same as or similar to draft scene generating component 112, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to reconfigure a scene based on timing and scene content, the system comprising:
one or more processors configured by machine-readable instructions to:
obtain scene information that defines scenes, wherein the scene information includes entity information that defines at least (i) motion and/or sound for individual entities, (ii) a virtual visual appearance of the individual entities, and (iii) a style of movement of the individual entities in individual ones of the scenes within individual virtual reality settings, wherein the individual virtual reality settings depict a virtual environment that includes a topography, nature elements, and/or interior elements, wherein one or more events transpire during the individual scenes,
wherein the scenes include a first scene in which a first event transpires, wherein the first scene includes performances of the entities within a first virtual reality setting over a scene duration from a scene beginning to a scene end, wherein the first event has a prospective event duration, wherein the first event has an unedited event duration from an event beginning to an event end, wherein the prospective event duration is a prospective duration of the first event within the first scene;
analyze the scene information that defines the first event to identify effectual content and ineffectual content related to the first event within the unedited event duration; and
generate, based on the scene information and the analysis, a first draft scene that includes an edited event comprising the effectual content from an edited event beginning to an edited event end in accordance with the prospective event duration.

2. The system of claim 1, wherein the prospective event duration includes a prospective event beginning, a prospective event end, and/or a length of time.

3. The system of claim 1, wherein effectual content includes a dialogue, a monologue, action, and/or a close-up.

4. The system of claim 3, wherein the ineffectual content includes a long shot of the entities, scenery content, traveling content, and/or excess action.

5. The system of claim 4, wherein the excess action includes an action that exceeds a particular action duration threshold.

6. The system of claim 4, wherein analyzing the scene information to identify the effectual content and the ineffectual content includes analyzing audio information to identify the dialogue, the monologue, and/or silence, determining changes in positions of the entities in the first virtual reality setting as a function of progress through the scene duration, and/or determining occurrence of a trigger based on the audio information and/or the scene sequences, wherein the scene information includes the audio information.

7. The system of claim 6, wherein the trigger includes a word, a phrase, and/or a particular action, wherein the audio information represents sounds made by users for embodiment by the entities in the first scene.

8. The system of claim 1, wherein the scene information includes multiple scene sequences, entity information, tuning information, and/or a maximum threshold duration of the event within the scene, wherein the scene sequences define positions of the entities in the virtual reality setting as a function of progress through the scene duration, wherein the tuning information that defines one or more of visual attributes, ambient audio, lighting, the style of movement for the entities, and/or an animation style of the scene.

9. The system of claim 8, wherein the positions of the entities are defined by video content captured from a scene sequence perspective.

10. The system of claim 8, wherein the positions of the entities are based on output signals generated by wearable sensors by users.

11. A method to reconfigure a scene based on timing and scene content, the method comprising:

obtaining scene information that defines scenes, wherein the scene information includes entity information that defines at least (i) motion and/or sound for individual entities, (ii) a virtual visual appearance of the individual entities, and (iii) a style of movement of the individual entities in individual ones of the scenes within individual virtual reality settings, wherein the individual virtual reality settings depict a virtual environment that includes a topography, nature elements, and/or interior elements, wherein one or more events transpire during the individual scenes, wherein the scenes include a first scene in which a first event transpires, wherein the first scene includes performances of entities within a first virtual reality setting over a scene duration from a scene beginning to a scene end, wherein the first event has a prospective event duration, wherein the first event has an unedited event duration from an event beginning to an event end, wherein the prospective event duration is a prospective duration of the first event within the first scene;

analyzing the scene information that defines the first event to identify effectual content and ineffectual content related to the first event within the unedited event duration; and generating, based on the scene information and the analysis, a first draft scene that includes an edited event comprising the effectual content from an edited event beginning to an edited event end in accordance with the prospective event duration.

12. The method of claim 11, wherein the prospective event duration includes a prospective event beginning, a prospective event end, and/or a length of time.

13. The method of claim 11, wherein effectual content includes a dialogue, a monologue, action, and/or a close-up.

14. The method of claim 13, wherein the ineffectual content includes a long shot of the entities, scenery content, traveling content, and/or excess action.

15. The method of claim 14, wherein the excess action includes an action that exceeds a particular action duration threshold.

16. The method of claim 14, wherein analyzing the scene information to identify the effectual content and the ineffectual content includes analyzing audio information to identify the dialogue, the monologue, and/or silence, determining changes in positions of the entities in the first virtual reality setting as a function of progress through the scene duration, and/or determining occurrence of a trigger based on the audio information and/or the scene sequences, wherein the scene information includes the audio information.

17. The method of claim 16, wherein the trigger includes a word, a phrase, and/or a particular action, wherein the audio information represents sounds made by users for embodiment by the entities in the first scene.

18. The method of claim 11, wherein the scene information includes multiple scene sequences, entity information, tuning information, and/or a maximum threshold duration of the event within the scene, wherein the scene sequences define positions of the entities in the virtual reality setting as a function of progress through the scene duration, wherein the tuning information that defines one or more of visual attributes, ambient audio, lighting, the style of movement for the entities, and/or an animation style of the scene.

19. The method of claim 18, wherein the positions of the entities are defined by video content captured from a scene sequence perspective.

20. The method of claim 18, wherein the positions of the entities are based on output signals generated by wearable sensors by users.

* * * * *